(12) United States Patent
Keskar et al.

(10) Patent No.: US 7,013,029 B2
(45) Date of Patent: Mar. 14, 2006

(54) INCORPORATING HANDWRITTEN NOTATIONS INTO AN ELECTRONIC DOCUMENT

(75) Inventors: Dhananjay V. Keskar, Beaverton, OR (US); Mic Bowman, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 583 days.

(21) Appl. No.: 09/897,703

(22) Filed: Jun. 29, 2001

(65) Prior Publication Data

US 2003/0026481 A1    Feb. 6, 2003

(51) Int. Cl.
*G06K 9/00*    (2006.01)

(52) U.S. Cl. ............... 382/119; 382/187; 382/314; 178/18.01; 178/18.09

(58) Field of Classification Search ........ 382/119–123, 382/115, 116, 112, 187–189, 314; 73/865.4; 178/18.01–20.04; 348/161
See application file for complete search history.

(56) References Cited

U.S. PATENT DOCUMENTS

| | | | | |
|---|---|---|---|---|
| 4,794,634 A | * | 12/1988 | Torihata et al. .......... 379/93.19 |
| 4,841,387 A | * | 6/1989 | Rindfuss .................... 360/72.1 |
| 4,845,768 A | | 7/1989 | Kochert et al. |
| 5,181,255 A | | 1/1993 | Bloomberg |
| 5,243,149 A | | 9/1993 | Comerford et al. |
| RE34,476 E | * | 12/1993 | Norwood .................... 382/186 |
| 5,309,359 A | | 5/1994 | Katz et al. |
| 5,615,285 A | | 3/1997 | Beernink |
| 5,629,499 A | * | 5/1997 | Flickinger et al. ........ 178/18.01 |
| 5,652,412 A | * | 7/1997 | Lazzouni et al. ......... 178/18.01 |
| 5,751,851 A | | 5/1998 | Guzik et al. |
| 5,802,204 A | | 9/1998 | Basehore |
| 5,852,434 A | * | 12/1998 | Sekendur ..................... 345/179 |
| 5,861,876 A | * | 1/1999 | Nakayama ................... 345/179 |
| 5,869,789 A | * | 2/1999 | Reid-Green .............. 178/18.01 |
| 5,890,177 A | | 3/1999 | Moody et al. |
| 5,960,448 A | | 9/1999 | Reichek et al. |
| 5,977,958 A | | 11/1999 | Baron et al. ................ 345/179 |
| 6,000,946 A | | 12/1999 | Snyders et al. |
| 6,050,490 A | * | 4/2000 | Leichner et al. ....... 235/462.49 |
| 6,154,758 A | | 11/2000 | Chiang |
| 6,249,283 B1 | | 6/2001 | Ur |
| 6,259,043 B1 | * | 7/2001 | Clary et al. .............. 178/18.01 |
| 6,360,951 B1 | | 3/2002 | Swinehart |
| 6,396,481 B1 | * | 5/2002 | Challa et al. ............... 345/169 |
| 6,396,598 B1 | * | 5/2002 | Kashiwagi et al. ......... 358/474 |
| 6,397,213 B1 | | 5/2002 | Cullen et al. |
| 6,573,887 B1 | * | 6/2003 | O'Donnell, Jr. ............ 345/179 |
| 6,584,479 B1 | | 6/2003 | Chang et al. |

(Continued)

OTHER PUBLICATIONS http://www.nocc.org/bytes/revuprod/v01/493.html, Orange Bytes, "I.R.I.S. Pen—Controllable OCR At Your Fingertips," Millward, Feb. 2000.

(Continued)

*Primary Examiner*—Bhavesh M. Mehta
*Assistant Examiner*—Aaron Carter
(74) *Attorney, Agent, or Firm*—Crystal D. Sayles

(57) ABSTRACT

An apparatus is disclosed that includes a memory storage unit to store an electronic version of a page and a processor coupled to the memory storage unit. The processor is configured to receive data associated with a handwritten notation applied to a printed page and an electronic image of an area of the printed version of the page near the notation, to identify a corresponding passage in the electronic version of the page and to create an electronic notation based on the received data and associated with the corresponding passage.

30 Claims, 6 Drawing Sheets

U.S. PATENT DOCUMENTS

| | | | |
|---|---|---|---|
| 6,592,039 B1 * | 7/2003 | Smith et al. | 235/462.49 |
| 6,625,335 B1 | 9/2003 | Kanai | |
| 6,666,376 B1 * | 12/2003 | Ericson | 235/454 |
| 6,681,372 B1 | 1/2004 | Yajima | |
| 6,687,876 B1 | 2/2004 | Schilit et al. | |
| 6,698,660 B1 * | 3/2004 | Fåhraeus et al. | 235/472.01 |
| 6,721,921 B1 | 4/2004 | Altman | |
| 6,737,591 B1 * | 5/2004 | Lapstun et al. | 178/19.05 |
| 6,742,161 B1 | 5/2004 | James et al. | |
| 6,782,144 B1 | 8/2004 | Bellavita et al. | |
| 2002/0088651 A1 * | 7/2002 | Carini et al. | 178/18.01 |
| 2002/0095440 A1 | 7/2002 | Burgess et al. | |
| 2002/0102022 A1 | 8/2002 | Ma et al. | |
| 2002/0114508 A1 | 8/2002 | Love | |
| 2002/0135786 A1 | 9/2002 | Ma et al. | |
| 2002/0184196 A1 | 12/2002 | Lehmeier et al. | |
| 2003/0004991 A1 * | 1/2003 | Keskar et al. | 707/512 |
| 2003/0089533 A1 * | 5/2003 | Lapstun et al. | 178/18.01 |
| 2003/0167276 A1 | 9/2003 | Simpson et al. | |

OTHER PUBLICATIONS http://www.irisusa.com/Products/irispen.html, "Irispen a handheld scanner by IRIS," last updated Mar. 23, 2001.

http://www.anoto.com/print_page.asp?cid=1, "Anoto—join the revolution," printed Jun. 6, 2001.

http://exn.ca/Templates/printstory.asp?PageName=Discovery&story_id=2000042752, "High Tech Pens," printed Jun. 5, 2001.

http://www.wired.com/news/comdex/0,1886,40190,00.html, "Bluetooth Comes to Your Notebook," Gartner, Nov. 15, 2000.

http://www.gen.com/vol20_no9/tech-report/4046-1.html, "New Tools Keep Users Connected Anywhere," Jackson, Apr. 30, 2001.

http://www.cpen.com/, C-pen homepage, printed Jun. 5, 2001.

Charles L. Rubin, "Running Microsoft Word 2000," pp. 832-837 (1999).

ScanSoft home page, http://www.scansoft.com, Jun. 28, 2001 (1 page).

Pending U.S. Appl. No. 09/896,123, entitled: "Correlating Handwritten Annotations to a Document", filed Jun. 29, 2001.

* cited by examiner

INCORPORATING HANDWRITTEN NOTATIONS INTO AN ELECTRONIC DOCUMENT

BACKGROUND

The invention relates to incorporating handwritten notations into an electronic document.

Documents such as reports, letters and slide presentations are often developed using an iterative review process. Such a process can include, for example, sequential or parallel reviews of the document by various participants. Comments, suggestions, and questions can be generated by each participant and can be provided in the form of handwritten notations on a printed version of the document.

Similarly, printed documents can be useful to supplement material reviewed during presentations, discussions, meetings or other verbal communications. Participants may take notes, write questions, or highlight different parts of a handout while participating in the associated verbal communication.

DETAILED DESCRIPTION

Figure 1:
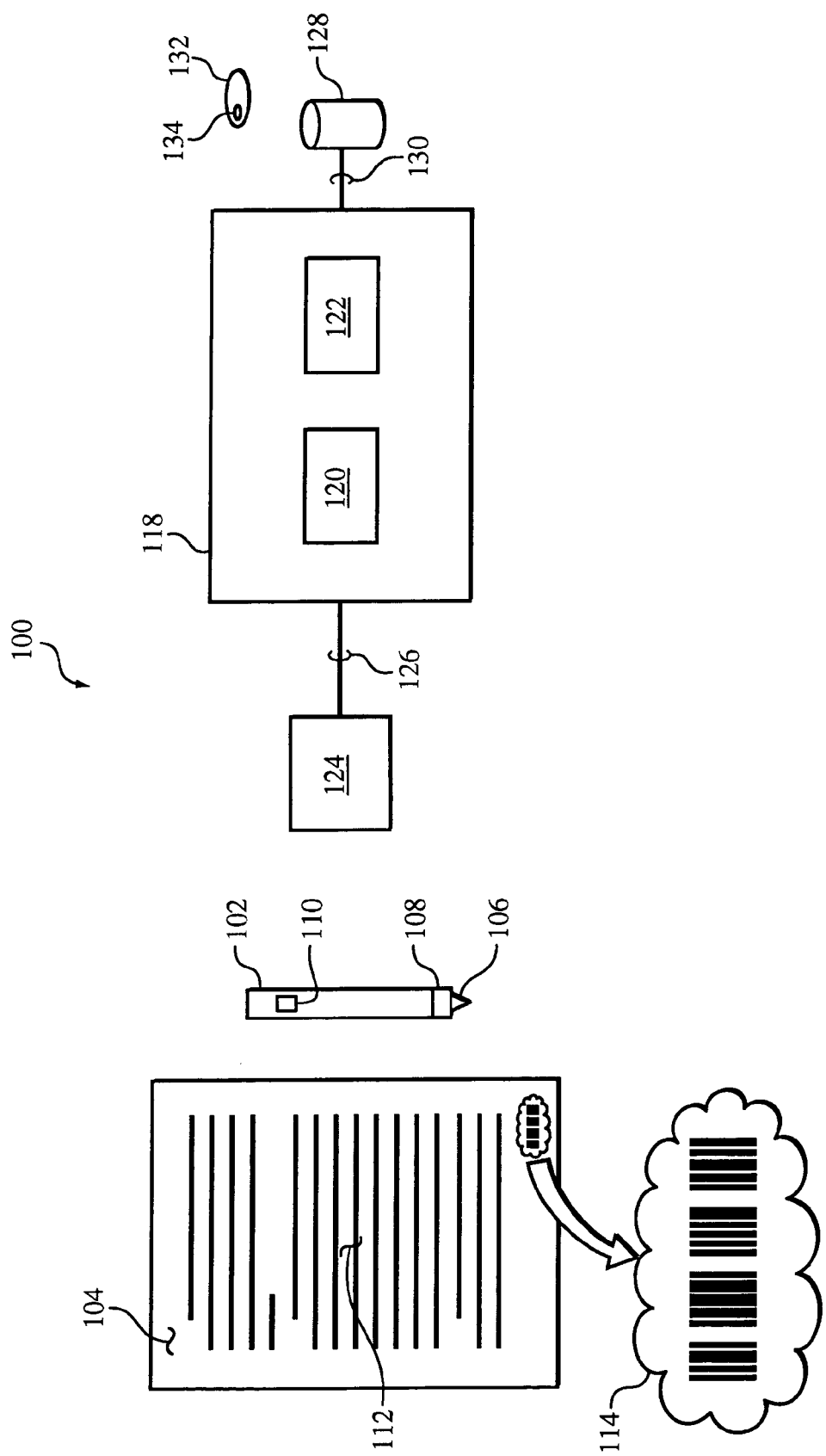
FIG. 1 is a system block diagram and a document with printed text.

The system 100 of FIG. 1 includes a writing utensil 102 capable of storing a writing medium, for example ink or lead, and dispensing it onto a surface, such as a page 104 of a document. The tip 106 of the writing utensil 102 dispenses the writing medium to allow an individual to apply notations to the page 104. The writing utensil 102 also can capture notation data for storage or further processing. Techniques for capturing notation data can include determining whether the tip 106 of the writing utensil 102 is in contact with the page 104 and tracking the writing utensil's 102 movement on the page 104. This can be accomplished, for example, by implementing echo-location techniques using radio frequency transmission or by using image processing techniques in conjunction with a page that includes a grid for tracking the motion of the writing utensil 102. An integral optical scanner 108 is positioned near the tip 106. The writing utensil 102 also includes a memory storage device 110 for storing images captured by the optical scanner and captured notation data.

The page 104 includes text 112 which may be a letter, a report, or any other printed document. The page 104 also could include an illustration. A unique page identifier 114, formatted as a bar code, is provided in the lower right hand corner of the page 104. Alternatively, the page identifier 114 could be an alphanumeric code affixed to the page 104.

A computer 118 including a processor 120 and a memory storage unit 122 is electrically coupled to an adapter 124 through a communications channel 126. The adapter 124 is configured to mate with the writing utensil 102 in such a manner as to enable the transfer of data.

The computer 118 also is electrically coupled to a disk drive 128 through a second communications channel 130. The disk drive 128 can receive a disk 132 containing computer-executable instructions 134 for the computer 118 to perform operations described below. The computer 118 can be coupled to other devices and be configured to read computer-executable instructions from computer readable mediums through those devices.

Figure 2:
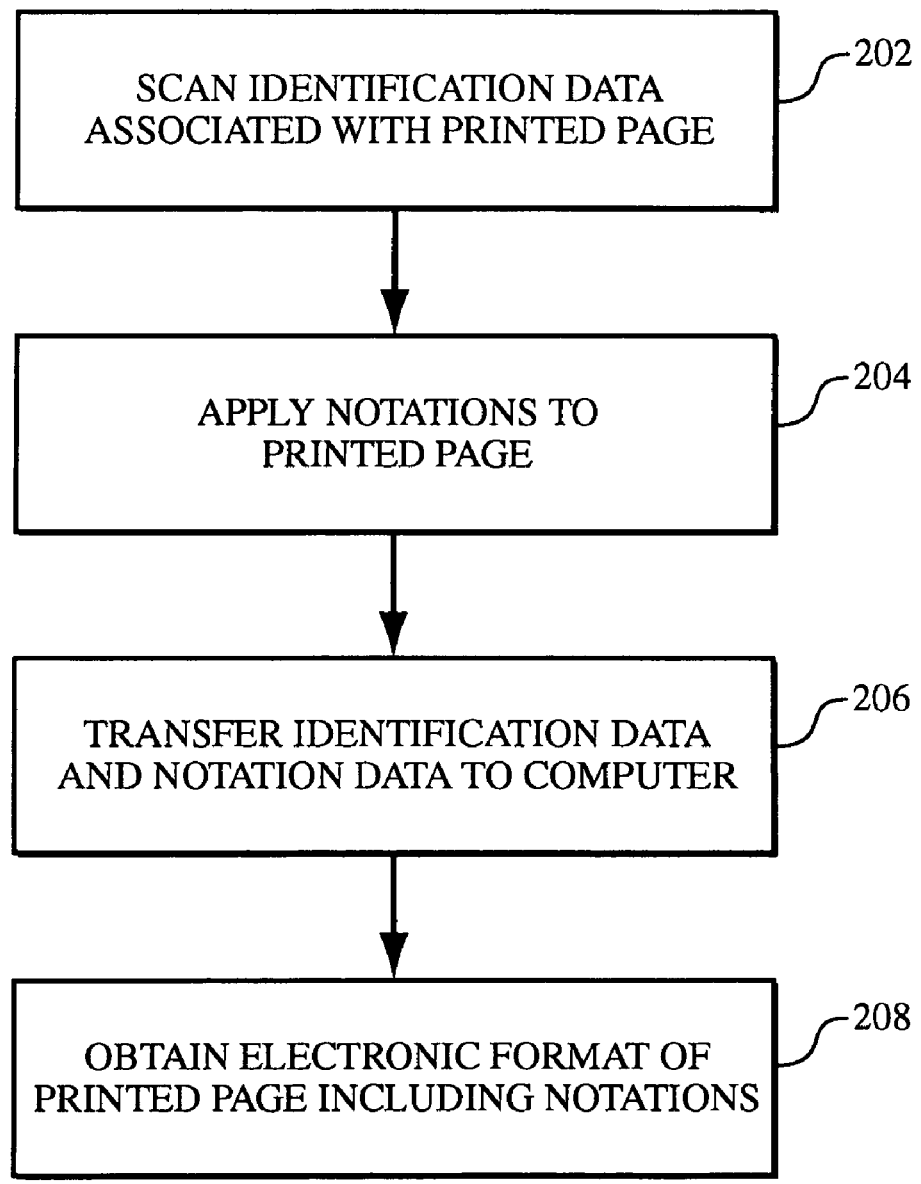
FIG. 2 is a flowchart outlining a users interface with a system.

As indicated by FIG. 2, an individual scans 202 the page identification data 114 associated with the printed page 104 using the writing utensil 102. This may be done by positioning the scanner 108 of the writing utensil 102 near the printed bar code 114. Alternatively, the individual can scan a document identification number and a separate page identification number. The scanned page identification data 114 is stored in the memory storage device 110 of the writing utensil 102.

An individual uses the writing utensil 102 to apply 204 a notation or multiple notations to the printed page 104. The notation could be, for example, a note, a question, or a sketch. The writing utensil 102 captures the notation data. The scanner 108 scans the area of the page near the notation as it is being applied. The notation data and an image of the surrounding area are stored in the memory storage device 110. The writing utensil 102 can create an association between the notation data and the scanned image.

The individual transfers 206 the stored page identification data 114, the stored image and the stored notation data to the computer 118 by coupling the writing utensil 102 with the adapter 124. The writing utensil 102 can include an electrical contact positioned to mate with a corresponding electrical contact on the adapter 124. The data passes through the connection. The data then passes from the adapter 124 to the computer 118 through the communications channel 126. The computer 118 stores this received data in the memory storage device 122. The processor 120 of the computer 118 can incorporate the received data into an electronic notation and indicate an association between the electronic notation and a corresponding passage of an electronic version of the text 112 in the document.

After transferring the data, the individual obtains 208 an electronic version of the printed page that includes electronically formatted notations corresponding to the handwritten notations applied to the printed version of the page 104. The electronically formatted notations can be associated with specific terms, phrases or passages of the page 104. Such an association may be indicated, for example, by a comment inserted into a word processing program, where the comment is in a digital format and is linked to a specific passage. Alternatively, a list of comments including corresponding document numbers, page numbers and/or line numbers referencing various sections of a document, can indicate such an association. The updated electronic version of the page 104 including notations can be printed, saved or further modified.

Figure 3A:
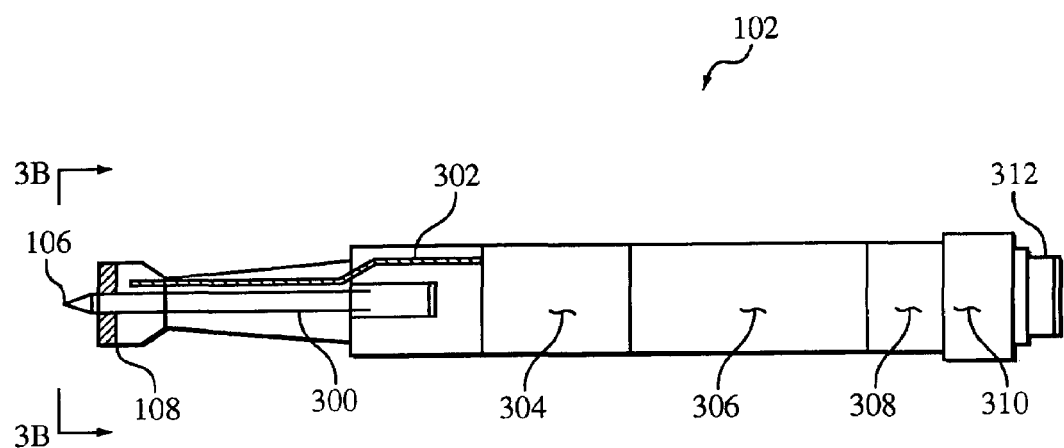
FIGS. 3A and 3B are views of a writing/scanning utensil.
Figure 3B:
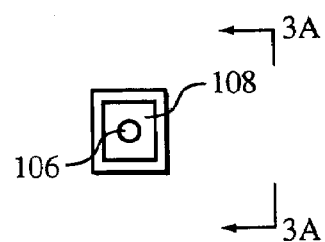

As shown in FIGS. 3A and 3B, the writing tip 106 of the writing utensil 102 extends from approximately the center of a front surface of the optical scanner 108 at one end of the writing utensil 102. The writing tip 106 is located at the end of a cartridge 300 that stores the writing medium. The writing tip 106 dispenses the writing medium from the cartridge 300 when the tip 106 contacts a surface of a document. The optical scanner 108 is positioned so that it can scan an area of a page near a notation being applied by the writing tip 106. Such an area can include printed data, such as words, letters, marks, drawings or bar codes. These scanned areas can be considered passage identifiers.

The writing utensil 102 includes a conductor 302 that carries data between the optical scanner 108 and a processor 304. The conductor can be electrical or optical. The processor 304 is configured to receive data from the conductor 302 and store it in a memory unit 306. The processor 304 can perform image-processing functions to create and modify images based on data received from the scanner 108. The processor 304 also can perform processing of captured notation data, for example, to create a bitmap image and can establish a correlation between specific notation data and a scanned image. Such images may be stored in the memory unit 306. The writing utensil 102 also includes a wireless transceiver 308 for transmitting and receiving data communicated between writing utensil 102 and a remote device such as the computer 118. A battery 310 is provided to support the operations of components in the writing utensil 102. A docking station 312 is provided to mate with the adapter 124 and includes a contact that can be mated with a complementary battery charging connection on the adapter 124. The docking station 312 also includes a second contact that can mate with a complimentary data contact of the adapter 124 for transferring data to the adapter 124 or other external device.

Figure 4:
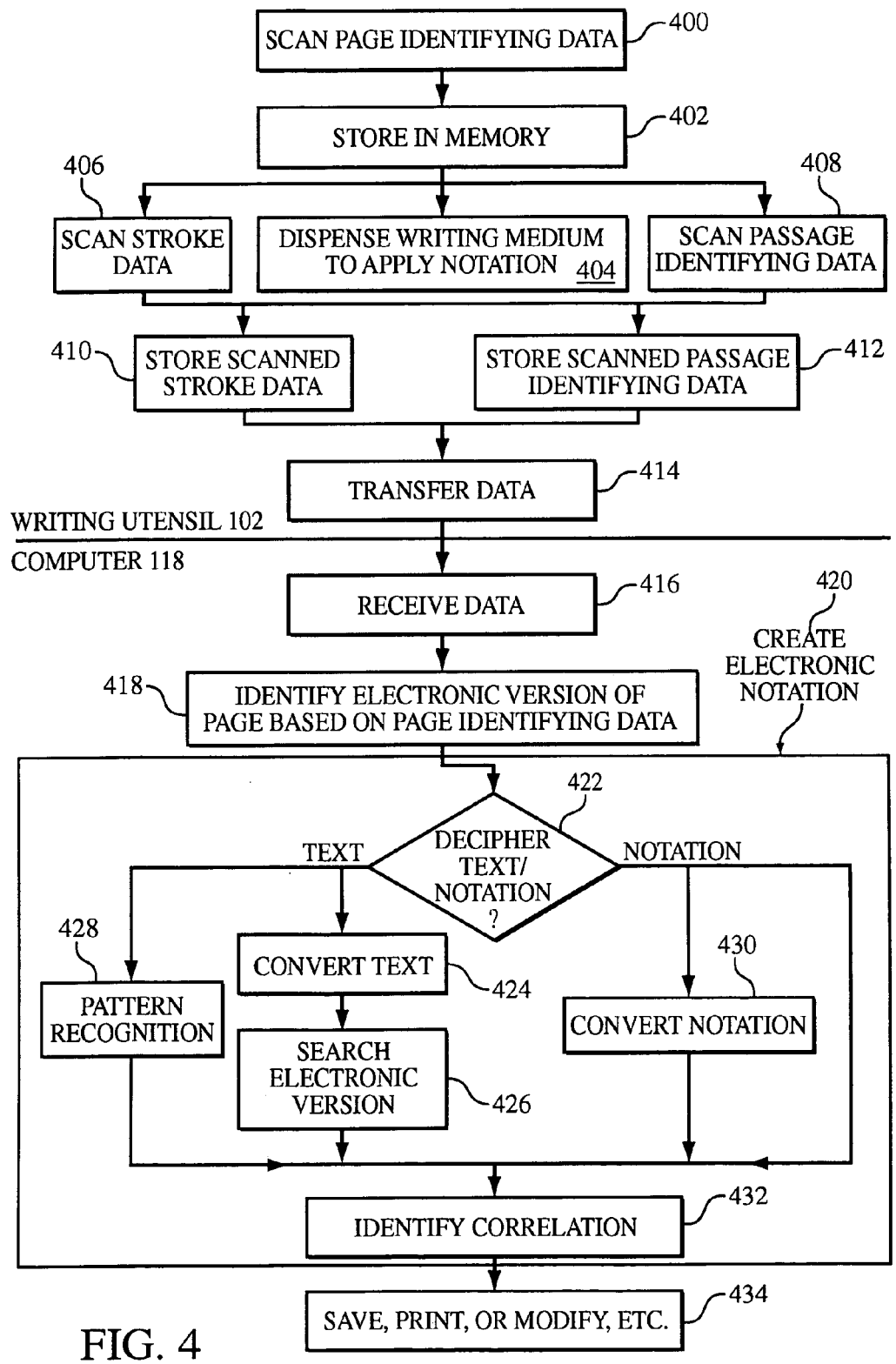
FIG. 4 is a flowchart outlining functions of a writing/scanning utensil and a computer.

Referring to FIG. 4, the optical scanner 108 scans 400 page identification data 114 printed on the page 104. This page identification data 114 travels through the conductor 302 to the processor 304 which stores 402 the data in the memory storage unit 306.

When the writing tip 106 dispenses 404 writing medium onto the page 104, the writing utensil 102 captures 406 stroke data associated with the notation being applied and the optical scanner 108 scans 408 an area of the page near the notation representing an associated passage. The processor 304 stores 410 the captured stroke data and stores an image of an area near the notation in the memory storage unit 306. Alternatively, the optical scanner 108 can be used to scan a portion of a passage that is underlined or circled by the writing utensil 102 to facilitate identifying an association between that portion of the passage and a particular notation. The writing utensil 102 may include a first operational mode used to scan an associated passage on a page without applying a notation and a second operational used to apply a notation to an area of a page without scanning.

The writing utensil 102 transfers 414 the stored data to the computer 118. The data can be transferred through the contacts of the docking station 312 or by employing wireless transmission technology using a transceiver device 308.

The computer 118 receives 416 the data from the writing utensil 102 and stores the data in the memory unit 122. Based on the received page identification data 114, the processor 120 identifies 418 an electronic version of the printed page stored in the memory storage device 122. The identification can be accomplished by correlating the received page identification data 114 with a file name associated with the electronic version of the page.

The computer 118 creates 420 a correlated electronic notation associated with a specific passage of the electronic version of the page. The processor 120 deciphers 422 which portion of the received image represents the notation and which portion of the received image represents printed text or other printed matter. The processor 120 can convert 424 the portion of the received image identified as representing printed text into digital text. That conversion can be accomplished using optical character recognition techniques. The processor 120 can then perform 426 a text search of the electronic version of the page stored in the memory storage device 122 to identify a passage containing the digital text. Alternatively, the processor 120 could employ 428 pattern recognition techniques and sub-image pattern recognition techniques to identify a passage of the electronic version of the page having patterns that substantially match patterns of the received image.

The processor 120 creates 430 an electronic notation based on the captured notation data. In some implementations, this can include creating a bitmap image or converting the notation data into digital text using handwritten character recognition techniques.

The processor 120 identifies 432 the correlation between the electronic notation and the identified passage of the electronic version of the page, for example, by inserting a comment into a word processing document.

The computer 118 can save, print or further modify 434 the updated electronic version of the page with the notation data.

Figure 5:
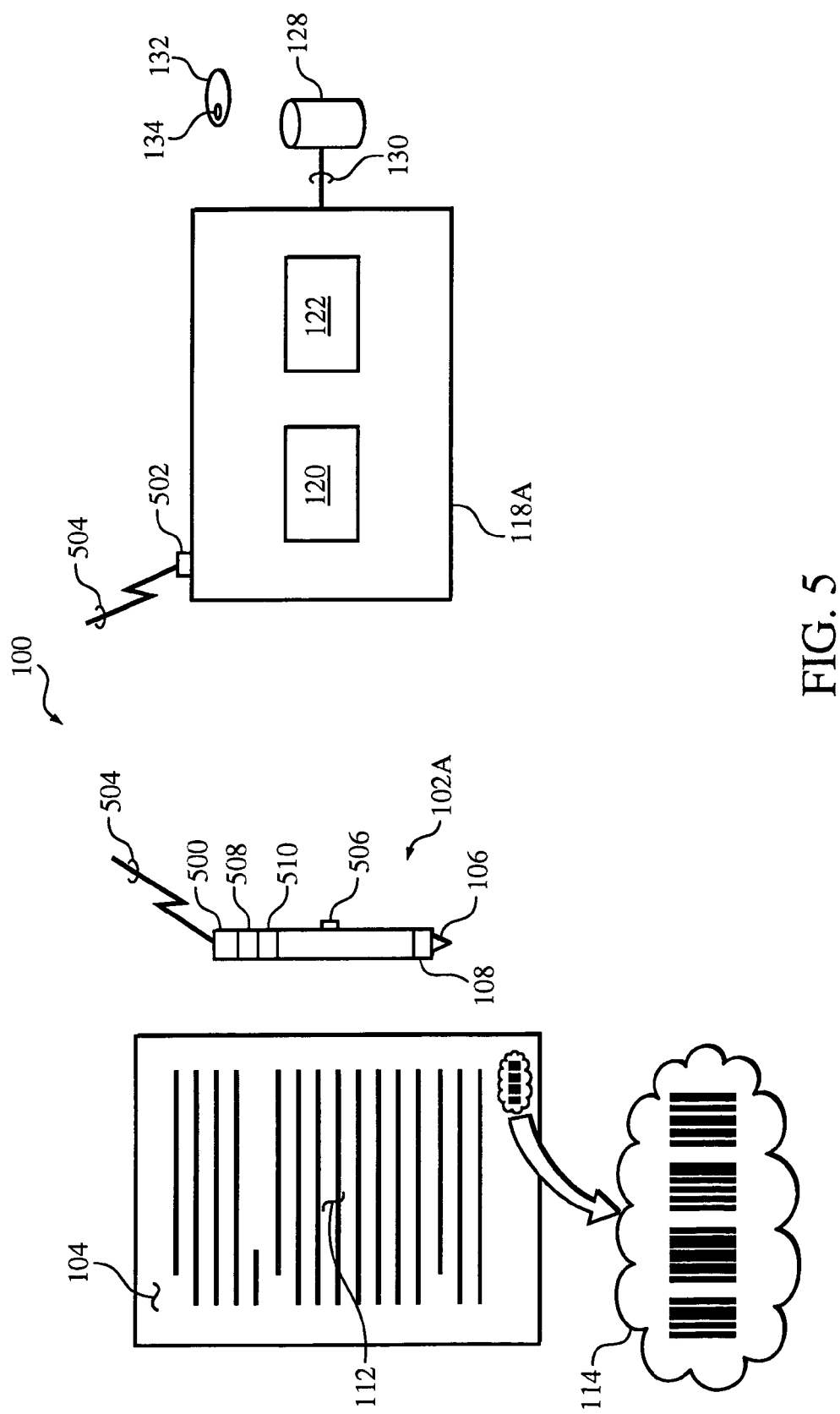
FIG. 5 is another implementation of a system block diagram and a document with printed text.

The writing utensil 102A of FIG. 5 includes a wireless transceiver 500 capable of communicating with a second wireless transceiver 502 of the computer 118A over a wireless communications channel 504. This arrangement can eliminate the need for a docking station 312 on the writing utensil 102 and can eliminate the need for an associated adapter 124 coupled to the computer 118A. Data can be transferred immediately to the computer 118A as it is scanned by the writing utensil 102A.

The writing utensil 102A includes a power switch 506 that can disconnect power from the optical scanner 108. The optical scanner 108 can be turned off at certain times to allow the user to apply notations to a page without having the notations scanned and saved into memory. Using the power switch 506 in this manner can help ensure that the available writing utensil memory is used efficiently and can extend the life of the writing utensil's battery 310. The power switch 506 also can extend the time it takes to completely fill available memory of the writing utensil 102A.

The writing utensil 102A includes a memory indicator 508 to indicate when available memory drops below a predefined level. A charge indicator 510 is provided to indicate when the charge in the battery 310 drops below a specified level. These indicators 508, 510 can include, for example, light emitting diodes (LEDs).

Figure 6:
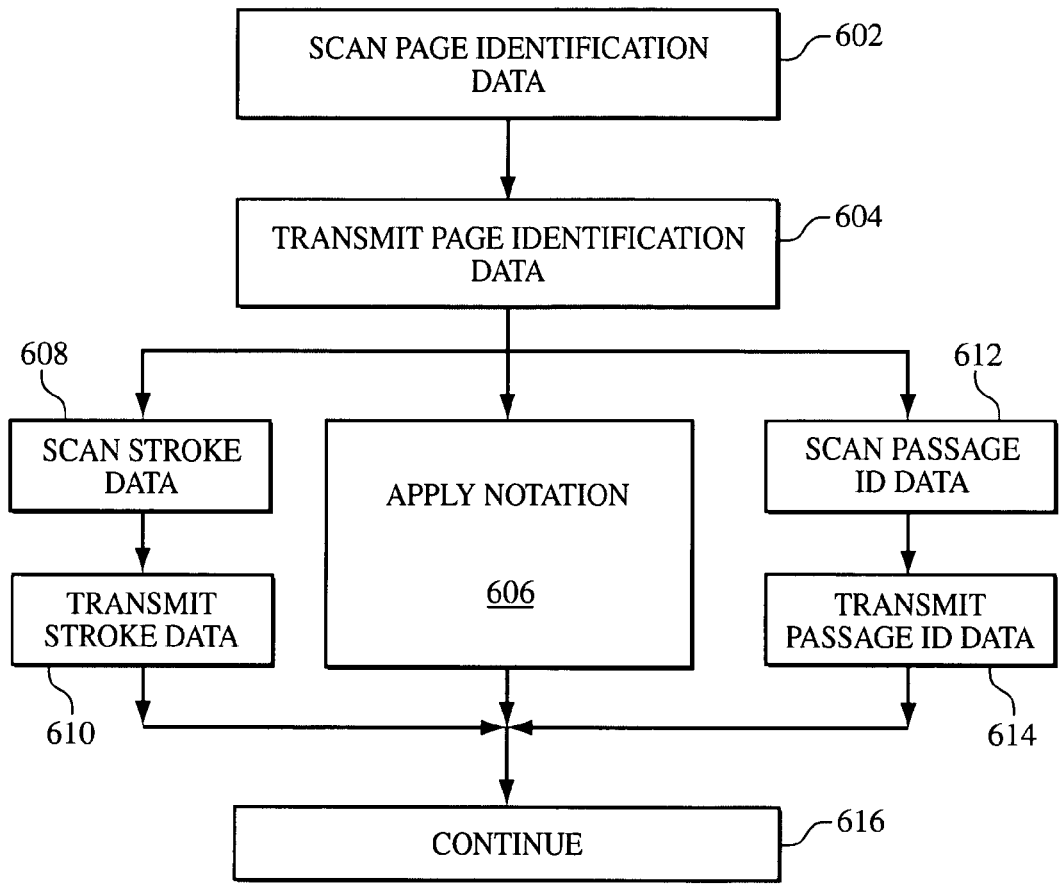
FIG. 6 is a flowchart outlining functions of an alternative implementation of a writing/scanning utensil.

As shown in FIG. 6, the writing utensil 102A can scan 602 page identifying data 114 and transmit 604 it to a remote device, such as the computer 118A. The writing utensil 102A can apply 606 a notation to the page 104 while simultaneously capturing 608 and transmitting 610 the stroke data as well as scanning 612 and transmitting 614 the passage identification data 114. The writing utensil 102A can establish a correlation between the captured stroke data and the scanned passage identification data. Upon receiving the transmitted data from the writing utensil 102A the computer 118A can operate in a manner similar to that described above with reference to the computer 118 of FIG. 4. The computer 118A can process the received data as soon as it is received or can store it for subsequent processing. Implementation of wireless transmission techniques can reduce the time required to create an updated electronic document including notations.

Systems implementing the techniques described above may provide one or more of the following advantages. Handwritten comments, notes or suggestions on a printed document may be incorporated automatically and quickly into an electronic version of the text of the document. That can facilitate conducting the extensive review processes that are often involved in preparing various documents. Documents being prepared for finalization or issue by an organization or individual can be updated relatively quickly, and a multilevel review process for a document can be expedited. Documents can be reviewed at any location and at any time using a pen and paper approach and comments, suggestions and changes can be incorporated rapidly into an electronic version of the text of the document. The techniques can enable a user to incorporate handwritten comments to a printed document into an electronic version of that document without requiring subsequent typing of the comments.

Modifications of the techniques described above are possible. For example, the writing utensil need not include the integral memory unit 110 or the wireless transceiver 500. The computer 118 can track data received from different pens and different document reviewers and customize each set of electronic notations received in different colors or fonts to indicate comments received from different people. The writing utensil 102 and the computer 118 may perform the tasks described above in a different order. The electronically formatted comments can be inserted into word processing documents, spreadsheet documents, slide presentation documents, computer aided drafting documents or other types of electronic documents. The battery can be replaceable. The scanner can be removable to allow the writing utensil to be used occasionally for writing purposes only. The writing medium cartridge 300 also can be replaceable. Removable and replaceable memory storage devices 110 may be used with the writing utensil so that when one memory storage device 110 becomes full, a user can remove it and replace it with a new one. The writing utensil also can allow a user to erase data stored in the integral memory storage device 110.

Various features of the system can be implemented in hardware, software or a combination of hardware and software. For example, some features of the system can be implemented in computer programs executing on programmable computers. Each program can be implemented in a high level procedural or object-oriented programming language to communicate with a computer system. Furthermore, each such computer program can be stored on a storage medium, such as read-only-memory (ROM) readable by a general or special purpose programmable computer or processor, for configuring and operating the computer when the storage medium is read by the computer to perform the functions described above.

Other implementations are within the scope of the following claims.

What is claimed is:

1. An apparatus comprising:
a memory storage unit to store an electronic version of a page; and
a processor coupled to the memory storage unit, the processor to receive data associated with a handwritten notation applied to a printed page and an electronic image of an area of the printed page near the notation, the electronic image including a printed passage comprising text, illustrations, or both the text and the illustrations, the processor to use the printed passage to identify a corresponding passage in the electronic version of the page stored in the memory storage unit, to use the data associated with the handwritten notation to create an electronic notation, and to incorporate the electronic notation in the electronic version of the page stored in the memory storage unit as a comment linked to the corresponding passage.

2. The apparatus of claim 1 wherein the processor is configured to identify the electronic version of the page based on a received page identifier.

3. The apparatus of claim 1 wherein the processor is configured to identify a first portion of the electronic image that represents the printed passage and to identify a second portion of the electronic image that represents the handwritten notation.

4. The apparatus of claim 3 wherein the processor is configured to apply optical character recognition to transform the first portion of the electronic image into digital text.

5. The apparatus of claim 4 wherein the processor is configured to identify the corresponding passage by searching the electronic version of the page for the digital text.

6. The apparatus of claim 1 wherein the processor is configured to create a bitmap image based on the data associated with the handwritten notation and to identify a correlation with the corresponding passage of the electronic version of the page.

7. The apparatus of claim 1 wherein the processor is configured to apply handwritten character recognition to transform the data associated with the handwritten notation into digital text and to identify a correlation between the digital text and the corresponding passage.

8. A system comprising:
a computer comprising a processor and a memory storage device storing an electronic version of a printed page; and
a writing utensil to apply a notation to the printed page, the writing utensil including a scanner positioned to scan a surface of the printed page as the notation is being applied to the printed page, the surface of the printed page including visible printed matter corresponding to a part of the electronic version of the printed page;
wherein the processor includes a port to receive from the writing utensil stroke data associated with the notation applied by the writing utensil and an electronic image of the visible printed matter of an area of the surface of the printed page near the applied notation scanned by the scanner, and is configured to create an electronic notation based on the stroke data and to incorporate the electronic notation into the electronic version of the printed page as a comment linked to the corresponding part of the electronic version of the printed page.

9. The system of claim 8 wherein the port is configured to receive an image of a page identifier scanned by the scanner and the processor is configured to identify the electronic version of the printed page in the memory storage device based on the received image of the page identifier.

10. The system of claim 8 wherein the processor is configured to apply optical character recognition to transform a part of the electronic image that represents the area of the printed page near the applied notation into digital text.

11. The system of claim 10 wherein the processor is configured to identify the corresponding part of the electronic version of the printed page by searching the electronic version of the printed page for a passage containing the digital text.

12. The system of claim 8 wherein the processor is configured to create a bitmap image based on the received stroke data and to identify a correlation between the bitmap image and the corresponding part of the electronic version of the printed page.

13. The system of claim 8 wherein the processor is configured to apply handwritten character recognition to transform the stroke data into digital text.

14. A method comprising:
applying a handwritten notation with a writing utensil to a page that includes a visible printed passage with which the handwritten notation is associated;
simultaneously capturing stroke data associated with the handwritten notation and scanning a portion of the associated printed passage with a scanner connected to the writing utensil to create a scanned image; and
correlating the captured stroke data with a particular portion of an electronic version of the page based on the scanned image.

15. The method of claim 14 comprising identifying a portion of the scanned image that represents the associated printed passage and applying optical character recognition to transform the portion into digital text.

16. The method of claim 15 comprising identifying the particular portion of the electronic version of the page by searching the electronic version of the page for a specific passage containing the digital text.

17. The method of claim 14 wherein capturing the stroke data comprises utilizing an echo-location technique.

18. The method of claim 14 wherein the page comprises grid marks and wherein capturing the stroke data comprises utilizing an image processing technique to track movement of the writing utensil based on the grid marks.

19. The method of claim 14 comprising creating a bitmap image based on the captured stroke data.

20. The method of claim 14 comprising applying handwritten character recognition to convert the stroke data into digital text.

21. The method of claim 20 comprising creating a link between the digital text and the particular portion of the electronic version of the page.

22. The method of claim 14 wherein correlating the captured stroke data with the particular portion of the electronic version of the page comprises employing a pattern recognition technique.

23. An article comprising a computer-readable medium that stores computer-executable instructions for causing a computer system to:
create an electronic notation in response to received data associated with a handwritten notation applied to a printed version of a page and a received electronic image of a passage identifier indicative of a visible printed passage on the page; and
incorporate the electronic notation into an electronic version of the page stored in memory as a comment linked to a passage in the electronic version of the page, wherein the passage in the electronic version of the page corresponds to the received electronic image of the passage identifier.

24. The article of claim 23 comprising computer-executable instructions for causing the computer system to identify the electronic version of the page in response to a received page identifier associated with the printed version of the page.

25. The article of claim 23 comprising computer-executable instructions for causing the computer system to apply optical character recognition to transform the received passage identifier into digital text and to identify the corresponding passage of the electronic version of the page by searching the electronic version of the page for a passage containing the digital text.

26. The article of claim 25 comprising computer-executable instructions for causing the computer system to indicate a correlation between the data associated with the notation and the passage containing the digital text.

27. An apparatus comprising:
a writing utensil having a writing tip to selectively dispense a writing medium onto a printed page for creating a notation and to capture stroke data associated with the notation, the writing utensil including a scanner positioned immediately above and outward from the writing tip to scan an area of the printed page near the notation as the notation is being applied to create an image, the scanned area including a printed passage, the printed passage visible to a user of the writing utensil;
a processor coupled to the writing utensil to identify a correlation between the stroke data and the image; and
memory coupled to the processor to store the stroke data, the image and the correlation.

28. The apparatus of claim 27 comprising a wireless transmitting device to transmit the image to a remote device.

29. The apparatus of claim 27 comprising an adjustable power switch to enable a user to selectively disconnect a power source from the scanner.

30. The apparatus of claim 27 comprising a conductive contact positioned to mate with an external adapter to transmit the image to a remote device.

* * * * *